United States Patent
Song

(10) Patent No.: US 9,311,877 B2
(45) Date of Patent: Apr. 12, 2016

(54) LIQUID CRYSTAL DISPLAY HAVING HIGH AND LOW LUMINANCES ALTERNATIVELY REPRESENTED

(75) Inventor: Jang-Kun Song, Seoul (KR)

(73) Assignee: SAMSUNG DISPLAY CO., LTD. (KR)

( * ) Notice: Subject to any disclaimer, the term of this patent is extended or adjusted under 35 U.S.C. 154(b) by 326 days.

(21) Appl. No.: 12/816,917

(22) Filed: Jun. 16, 2010

(65) Prior Publication Data

US 2011/0115782 A1 May 19, 2011

(30) Foreign Application Priority Data

Nov. 17, 2009 (KR) .................. 10-2009-0111006

(51) Int. Cl.
*G06F 3/038* (2013.01)
*G09G 5/00* (2006.01)
*G09G 3/36* (2006.01)

(52) U.S. Cl.
CPC ...... *G09G 3/3659* (2013.01); *G09G 2300/0852* (2013.01); *G09G 2310/067* (2013.01); *G09G 2320/0261* (2013.01)

(58) Field of Classification Search
CPC .............. G09G 3/3659; G09G 2320/0261; G09G 2310/067; G09G 2300/0852
USPC ................................... 345/99, 213
See application file for complete search history.

(56) References Cited

U.S. PATENT DOCUMENTS

| | | | |
|---|---|---|---|
| 5,126,865 A | 6/1992 | Sarma | |
| 5,506,598 A * | 4/1996 | Shimada et al. | 345/92 |
| 5,818,407 A | 10/1998 | Hori et al. | |
| 6,295,054 B1 * | 9/2001 | McKnight | 345/205 |
| 7,212,183 B2 * | 5/2007 | Tobita | 345/93 |
| 7,633,472 B2 * | 12/2009 | Edwards | 345/87 |
| 7,961,171 B2 * | 6/2011 | Miyasaka et al. | 345/104 |
| 7,995,155 B2 * | 8/2011 | Yang et al. | 349/48 |
| 8,217,877 B2 * | 7/2012 | Fukutome | 345/92 |
| 8,692,752 B2 * | 4/2014 | Chang et al. | 345/87 |
| 2006/0145988 A1 * | 7/2006 | Hsieh et al. | 345/92 |
| 2007/0057888 A1 | 3/2007 | Lin et al. | |
| 2007/0139346 A1 * | 6/2007 | Chen et al. | 345/98 |
| 2008/0062340 A1 * | 3/2008 | Um et al. | 349/38 |
| 2008/0180370 A1 | 7/2008 | Huang et al. | |
| 2009/0027581 A1 * | 1/2009 | You et al. | 349/48 |

FOREIGN PATENT DOCUMENTS

| | | | |
|---|---|---|---|
| EP | 2053589 A1 | 4/2009 | |
| JP | 07-098461 A | 11/1995 | |
| JP | 2590693 B2 | 12/1996 | |
| JP | 2007-293158 A | 8/2007 | |
| KR | 100218584 B1 | 9/1999 | |
| KR | 1020030065817 A | 8/2003 | |
| KR | 1020050018520 A | 2/2005 | |

(Continued)

*Primary Examiner* — Kwang-Su Yang

(74) *Attorney, Agent, or Firm* — Cantor Colburn LLP

(57) ABSTRACT

A liquid crystal display includes: a liquid crystal capacitor; a first switching element which transmits a data voltage to the liquid crystal capacitor; a second switching element connected to the liquid crystal capacitor; and a transformation capacitor connected to the second switching element. A difference between a first time when the first switching element is turned on and a second time when the second switching element starts is turned on is greater than 1 horizontal period and less than 1 frame period.

16 Claims, 13 Drawing Sheets

(56) References Cited

FOREIGN PATENT DOCUMENTS

| KR | 1020050098631 A | 10/2005 |
| KR | 100717190 B1 | 5/2007 |
| KR | 1020070118797 | 12/2007 |
| KR | 1020080022446 A | 3/2008 |
| KR | 1020080023015 A | 3/2008 |
| KR | 1020080056481 A | 6/2008 |
| KR | 1020090010764 | 1/2009 |
| KR | 1020090060197 A | 6/2009 |

* cited by examiner

PX

LIQUID CRYSTAL DISPLAY HAVING HIGH AND LOW LUMINANCES ALTERNATIVELY REPRESENTED

This application claims priority to Korean Patent Application No. 10-2009-0111006, filed on Nov. 17, 2009, and all the benefits accruing therefrom under 35 U.S.C. §119, the content of which in its entirety is herein incorporated by reference.

BACKGROUND OF THE INVENTION (1) Field of the Invention

The present invention relates to a liquid crystal display and, more particularly, the present invention relates to a liquid crystal display having substantially improved viewing angle, visibility and motion picture display characteristics.

(2) Description of the Related Art

A liquid crystal display ("LCDs) is a widely used type of flat panel display. The liquid crystal display typically has two display panels on which field generating electrodes, such as pixel electrodes and a common electrode, are disposed, and a liquid crystal layer interposed between the two display panels. In the liquid crystal display, voltages are applied to the field generating electrodes to generate an electric field in the liquid crystal layer, and an alignment of liquid crystal molecules in the liquid crystal layer is determined by the electric field. Accordingly, a polarization of light incident to the liquid crystal layer is controlled to display an image on the liquid crystal display.

A popular type of LCD includes the field generating electrodes disposed on the two display panels, and further includes a thin film transistor ("TFT") for switching a voltage applied to one of the field generating electrodes.

More particularly, in a twisted nematic ("TN") mode LCD, for example, when no electric field is applied, the liquid crystal molecules are aligned such that long axes thereof between the two display panels are substantially parallel to surfaces of the two display panels, and are spirally twisted with a predetermined pitch from one panel to the other, thereby forming a twisted structure. Accordingly, the arrangement orientation of the long axes of the liquid crystal molecules is continuously changed. Since the liquid crystal layer in the TN mode LCD has a positive dielectric anisotropy, when the electric field is generated substantially perpendicular to the two display panels, the liquid crystal molecules are aligned substantially parallel to the electric field direction, which is substantially perpendicular to the two display panels.

However, due to refractive anisotropy, the LCD has a disadvantage of a viewing direction dependency. Specifically, color and contrast ratio greatly depend on the viewing direction of the LCD, and a reference viewing angle is narrow. As a result, gray inversion occurs in the LCD. Thus, the LCD has poor lateral visibility as compared with front visibility. More specifically, for example, the LCD displays an image that becomes bright and a color thereof becomes more white color as a viewed portion of the image moves away from the front of the LCD, and, in some cases, a luminance difference between high grays actually vanishes, such that the image cannot be viewed. Moreover, LCDs are increasingly being used for multimedia devices, such that wide-angle viewing of pictures and motion pictures is increased, and, as a result, there is a substantial need for an LCD having advantages that overcome the abovementioned deficiencies and include, for example, improved visibility and viewing angle.

BRIEF SUMMARY OF THE INVENTION

Exemplary embodiments of the present invention provide a liquid crystal display ("LCD") having substantially improved gray inversion, thereby significantly improving viewing angle and visibility of the LCD.

Exemplary embodiments of the present invention also provide an LCD having additional advantages that include, but are not limited to, substantially improve motion picture display characteristics.

A liquid crystal display according to an exemplary embodiment of the present invention includes: a liquid crystal capacitor; a first switching element that transmits a data voltage to the liquid crystal capacitor; a second switching element connected to the liquid crystal capacitor; and a transformation capacitor connected to the second switching element. A difference between a first time when the first switching element is turned on and a second time when the second switching element is turned on is greater than one (1) horizontal period ("1 H") and less than one (I) frame period.

The difference between the first time and the second time may be greater than or equal to about one-third (⅓) of the frame period and less than or equal to about two-thirds (⅔) of the frame period.

The difference between the first time and the second time may be about one-half (½) of the frame period.

The second switching element may be turned on after the first switching element is turned off.

The liquid crystal display may further include a storage capacitor connected to the first switching element and the liquid crystal capacitor.

The storage capacitor may be connected to a storage electrode line that transmits a common voltage.

The transformation capacitor may be connected to the storage electrode line.

A capacitance of the transformation capacitor may be greater than or equal to about 0.12 times a sum of a capacitance of the liquid crystal capacitor and a capacitance of the storage capacitor and less than or equal to about 0.5 times the sum of the capacitance of the liquid crystal capacitor and the capacitance of the storage capacitor.

The first switching element may be controlled by a first gate signal transmitted by a first gate line, and the transformation capacitor may be connected to the first gate line.

The capacitance of the transformation capacitor may be greater than about 0.12 times the sum of the capacitance of the liquid crystal capacitor and the capacitance of the storage capacitor and less than about 0.5 times the sum of the capacitance of the liquid crystal capacitor and the capacitance of the storage capacitor.

The second switching element may be controlled by a second gate signal transmitted by a second gate line, and the storage capacitor may be connected to the second gate line.

A liquid crystal display according to another exemplary embodiment of the present invention includes: a substrate; a first gate line and a second gate line disposed on the substrate; a data line disposed on the substrate; a first thin film transistor including a first control electrode connected to the first gate line, a first source electrode connected to the data line and a first drain electrode; a second thin film transistor including a second control electrode connected to the second gate line, a second source electrode connected to the first drain electrode and a second drain electrode; a transformation capacitor including a first terminal connected to the second drain electrode and a second terminal; and a pixel electrode connected to the first drain electrode. In an exemplary embodiment, a difference between a first time when a first gate-on voltage is applied to the first gate line and a second time when a second gate-on voltage is applied to the second gate line is greater than one (1) horizontal period 1 H and less than about one (I) frame period.

The difference between the first time and the second time may be greater than or equal to about one-third (⅓) of the frame period and less than or equal to about two-thirds (⅔) of the frame period.

The difference between the first time and the second time may be about one-half (½) of the frame period.

In an exemplary embodiment, the first gate-on voltage and the second gate-on voltage do not temporally overlap each other.

At least a portion of at least one of the pixel electrode and the first drain electrode may overlap at least a portion of a storage electrode line that transmits a common voltage.

The second terminal of the transformation capacitor may be connected to the storage electrode line.

The second terminal of the transformation capacitor may be connected to the first gate line.

At least a portion of at least one of the pixel electrode and the first drain electrode may overlap at least a portion of the second gate line.

The second terminal of the transformation capacitor may be connected to a storage electrode line that transmits a common voltage.

A voltage of the pixel electrode may become a first data voltage at the first time and may become a second data voltage at the second time, and a ratio of the second data voltage to the first data voltage may be greater than or equal to about 0.5 and less than or equal to about 0.8.

The liquid crystal display may further include a first gate driver connected to the first gate line and a second gate driver connected to the second gate line, and the first gate driver and the second gate driver may both be positioned at a same peripheral area, e.g., one edge, of the substrate.

In another exemplary embodiment, the first gate driver and the second gate driver may be disposed at different, e.g., opposite, peripheral portions of the substrate.

In yet another additional exemplary embodiment, a method of driving an LCD, which includes a liquid crystal capacitor, a first switching element, a second switching element and a transformation capacitor, is provided, and the method includes transmitting a data voltage to the liquid crystal capacitor by turning on the first switching element, and turning on the second switching element after the first switching element is turned off. In an exemplary embodiment, a difference between a first time when the first switching element is turned on and a second time when the second switching element is turned on is greater than 1 horizontal period 1 H and less than 1 frame period.

Thus, according to the exemplary embodiments of the present invention as described herein, a liquid crystal capacitor receives a data voltage through a data line, and a pixel voltage is decreased through a transformation capacitor at a middle time before one frame is finished, such that high and low luminances are alternatively represented during one frame. Accordingly, a viewing angle and side visibility of an exemplary embodiment of the LCD are substantially improved, while motion picture display characteristics of the LCD are also significantly improved.

BRIEF DESCRIPTION OF THE DRAWINGS

The above and other aspects of the present invention will become more readily apparent by describing in further detail exemplary embodiments thereof with reference to the accompanying drawings, in which.

DETAILED DESCRIPTION OF THE INVENTION

Figure 1:
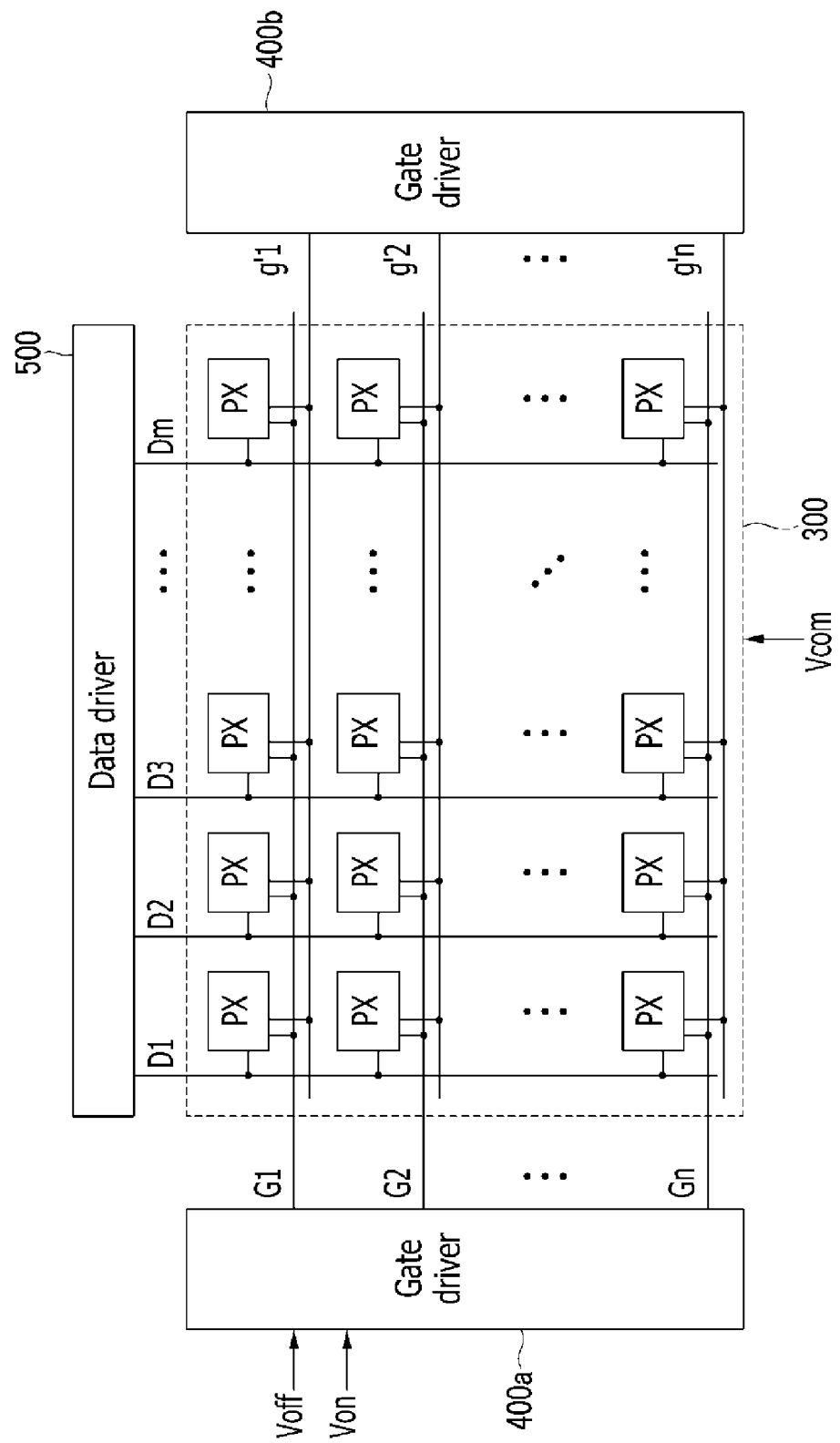
FIG. 1 and FIG. 2 are block diagrams of exemplary embodiments of a liquid crystal display ("LCD") according to the present invention.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting. As used herein, the singular forms "a," "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

A liquid crystal display ("LCD") according to an exemplary embodiment of the present invention will now be described in further detail with reference to the accompanying drawings.

Figure 2:
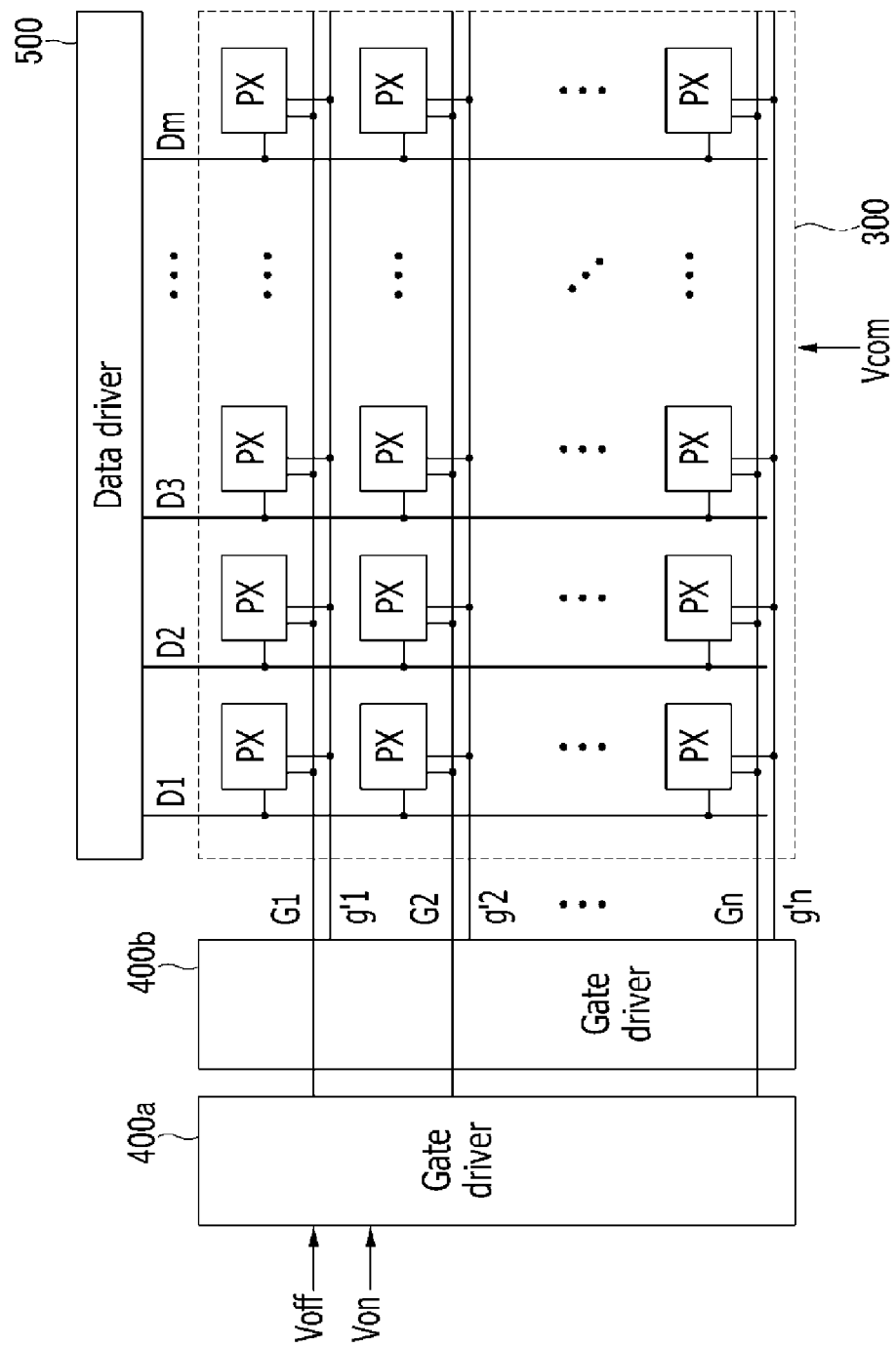
Figure 3:
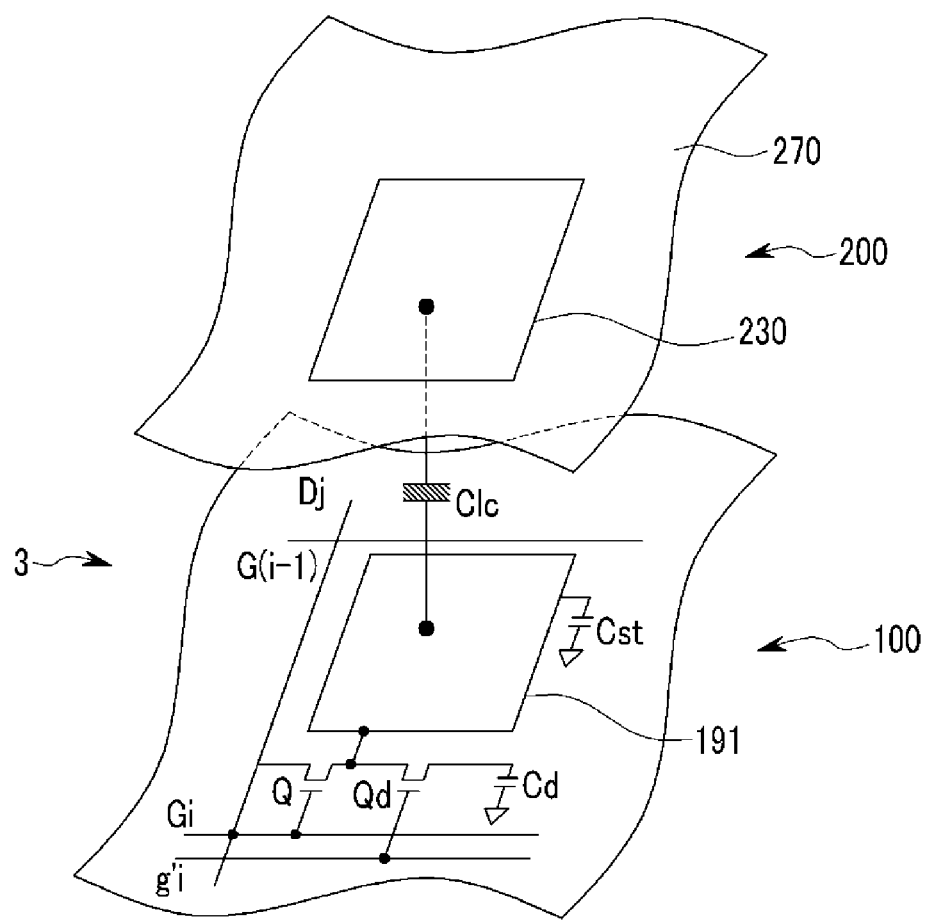
FIG. 3 is an equivalent circuit view of an exemplary embodiment of a pixel of a liquid crystal display according to the present invention.
Figure 4:
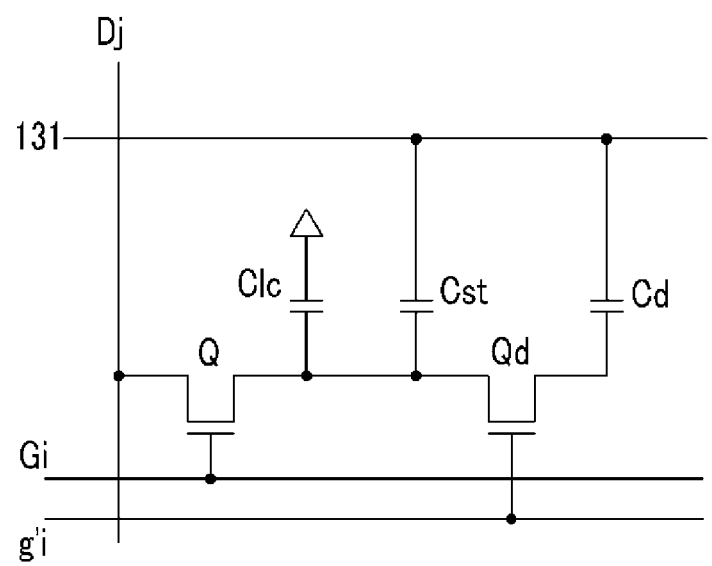
FIG. 4 is a schematic circuit diagram of an exemplary embodiment of one pixel of a liquid crystal display according to the present invention.

FIG. 1 and FIG. 2 are block diagrams of an exemplary embodiment of an LCD according to the present invention, FIG. 3 is an equivalent circuit view of an exemplary embodiment of a pixel of a liquid crystal display according to the present invention, and FIG. 4 is a schematic circuit diagram of an exemplary embodiment of one pixel of a liquid crystal display according to the present invention.

Referring to FIG. 1 and FIG. 2, a liquid crystal display according to an exemplary embodiment of the present invention includes a liquid crystal panel assembly 300, gate drivers 400a and 400b, e.g., a pair of gate drivers including a first gate driver 400a and a second gate driver 400b, and a data driver 500.

As shown in FIGS. 1 and 2, the liquid crystal panel assembly 300 includes a plurality of signal lines G1-Gn, D1-Dm and g'1-g'n, and pixels PX that are connected to the plurality of signal lines G1-Gn, D1-Dm and g'1-g'n and disposed in a substantially matrix pattern including pixel rows and columns on a lower panel 100 (FIG. 3). As shown in FIG. 3, the liquid crystal panel assembly 300 includes the lower panel 100 and an upper panel 200 that faces the lower panel 100, e.g., is disposed opposite to the lower panel 100, and a liquid crystal layer 3 interposed between the lower panel 100 and the upper panel 200.

The plurality of signal lines G1-Gn, D1-Dm and g'1-g'n include first gate lines G1-Gn for transmitting a first gate signal, second gate lines g'1-g'n for transmitting a second gate signal, and data lines D1-Dm for transmitting a data signal. The first gate lines G1-Gn and the second gate lines g'1-g'n are alternately arranged along a first, substantially column, direction (as viewed in FIGS. 1 and 2) and, in an exemplary embodiment, are disposed in pairs, as shown in FIGS. 1 and 2. The first gate lines G1-Gn and the second gate lines g'1-g'n extend substantially along a second, substantially row, direction, which is substantially perpendicular to the first direction, and substantially parallel to each other, while the data lines D1-Dm extend substantially in the column direction and substantially parallel to each other. The plurality of signal lines G1-Gn, D1-Dm and g'1-g'n may further include a storage electrode line 131 for transmitting a common voltage Vcom.

Referring to FIG. 3 and FIG. 4, each pixel PX, such as the pixel PX connected to an i-th (where i=1, 2, ..., n) first gate line Gi and an i-th second gate line g'i, and a j-th (where j=1, 2, ..., m) data line Dj, for example, includes a first switching element Q connected to the i-th first gate line Gi and the j-th data line Dj, a liquid crystal capacitor Clc and a storage capacitor Cst connected thereto, a second switching element Qd connected to the first switching element Q, and the i-th second gate line g'i and a transformation capacitor Cd connected to the second switching element Qd.

In an exemplary embodiment, the first switching element Q and the second switching element Qd are three-terminal elements, such as a thin film transistor ("TFT"), for example, disposed on the lower panel 100, and the first switching element Q includes a control terminal connected to the i-th gate line Gi, an input terminal connected to the j-th data line Dj, and an output terminal connected to the liquid crystal capacitor Clc and the storage capacitor Cst.

The second switching element Qd includes a control terminal connected to the i-th second gate line g'i, an input terminal connected to an output terminal of the first switching element Q and/or the liquid crystal capacitor Clc, and an output terminal connected to the transformation capacitor Cd.

The liquid crystal capacitor Clc includes as terminals thereof a pixel electrode 191 of the lower panel 100 and a common electrode 270 of the upper panel 200, and a liquid crystal layer 3 disposed between the pixel electrode 191 and the common electrode 270 as a dielectric material, as shown in FIG. 3. In an exemplary embodiment, the common electrode 270 is disposed on an entire surface of the upper panel 200 and receives the common voltage Vcom.

The liquid crystal layer 3 may include liquid crystal molecules (not shown) having a twisted nematic (TN) mode and which are sequentially twisted from the lower panel 100 to the upper panel 200. In an exemplary embodiment, the liquid crystal layer 3 has positive dielectric anisotropy, although additional exemplary embodiments are not limited thereto. For example, in another exemplary embodiment, the liquid crystal layer 3 may have various modes, such as a vertically aligned ("VA") mode in which the liquid crystal molecules are aligned such that the long axes of the liquid crystal molecules are arranged perpendicular to the surface of two display panels in the absence of an electric field.

The storage capacitor Cst is formed from the storage electrode line 131, disposed on the lower panel 100, and the pixel electrode 191 overlapping the storage electrode line 131 with an insulator interposed therebetween. In an exemplary embodiment, the storage capacitor Cst supplements, e.g., enhances, a voltage storage capacity of the liquid crystal capacitor Clc.

The transformation capacitor Cd is formed by overlapping the output terminal of the second switching element Qd and a portion of the storage electrode line 131 with an insulator interposed therebetween.

For color display, each pixel PX represents, for example, one color of the primary colors (spatial division) or, alternatively, each pixel PX sequentially represents the primary colors in turn (temporal division), such that a spatial or temporal sum of the primary colors is displayed as a desired color. The primary colors may include red, green and blue. Specifically, FIG. 3 shows an exemplary embodiment in which spatial division, wherein each pixel PX includes a color filter 230 representing one of the primary colors is disposed in an area of the upper panel 200 facing the pixel electrode 191. Alternatively, the color filter 230 may be provided on or under the pixel electrode 191 on the lower panel 100.

Referring now to FIGS. 1-4, the gate drivers 400a and 400b are connected to the first gate lines G1-Gn and the second gate lines g'1-g'n, respectively, of the liquid crystal panel assembly 300, and apply gate signals, which are obtained by combining a gate-on voltage Von for turning on the first switching element Q and the second switching element Qd and a gate-off voltage Voff for turning the first switching element Q and the second switching element Qd off, to the first gate lines G1-Gn and the second gate lines g'1-g'n, respectively.

As shown in FIG. 1, the pair of gate drivers 400a and 400b are positioned on opposite (right and left) sides (e.g., peripheral portions), respectively, of the liquid crystal panel assembly 300, but additional exemplary embodiments are not limited thereto. Specifically, for example, in the exemplary embodiment shown in FIG. 2, the pair of gate driver 400a and 400b are positioned on a same side, e.g., peripheral portion, of the liquid crystal panel assembly 300. In yet another exemplary embodiment, two driving circuits (not shown) may be integrated into one gate driver (not shown).

The data driver 500 is connected to the data lines D1 to Dm of the liquid crystal panel assembly 300, and supplies the data voltage as a data signal to the data lines D1 to Dm.

Each of the gate drivers 400a and 400b and the data driver 500 may be directly mounted as at least one integrated circuit ("IC") chip on the liquid crystal panel assembly 300 or on a flexible printed circuit film (not shown) in a tape carrier package ("TCP") type package, attached to the liquid crystal panel assembly 300, or, alternatively, may be mounted on an additional printed circuit board ("PCB") (not shown). Alternatively, the gate drivers 400a and 400b and the data driver 500 may be integrated with the liquid crystal panel assembly 300 along with the plurality of signal lines G1-Gn, D1-Dm and g'1-g'n, as well as with the first thin film transistor Q and the second thin film transistor Qd. Further, the gate drivers 400a and 400b and the data driver 500 may be integrated as a single chip. In this case, at least one of the abovementioned drivers, or at least one circuit device including at least one of the same, may be located outside the single chip.

An exemplary embodiment of an operation of the LCD will now be described in further detail with reference to FIG. 5 as well as FIGS. 1 to 4.

Figure 5:
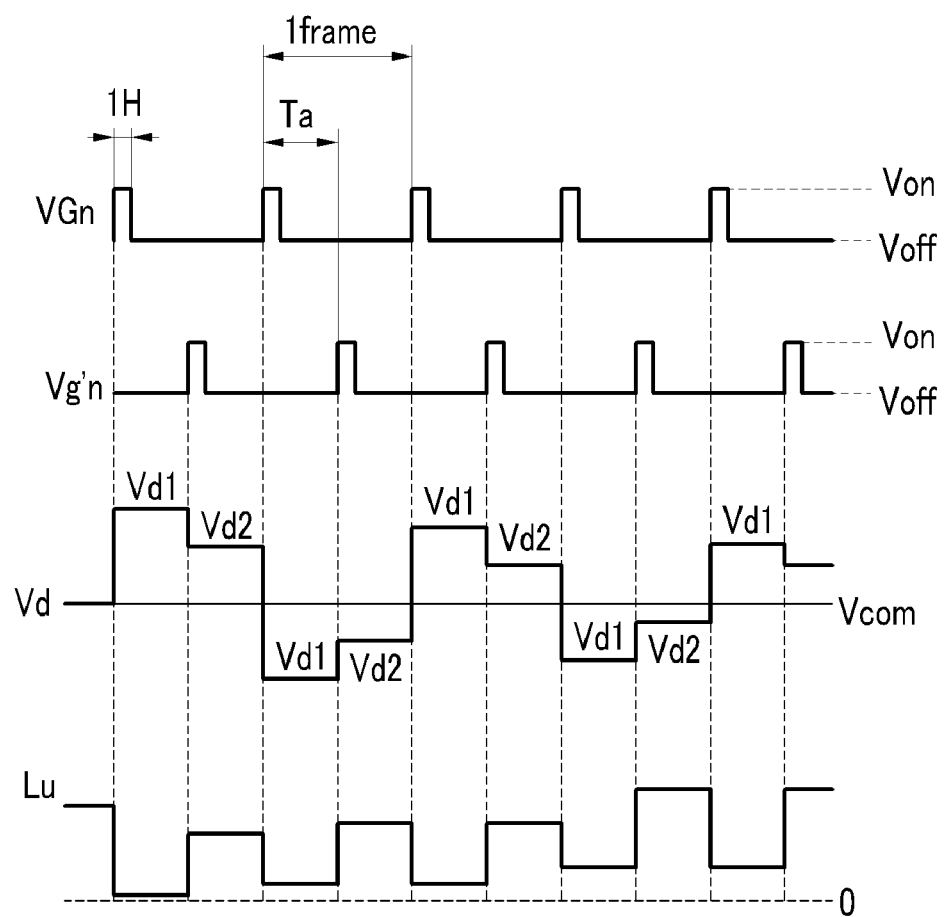
FIG. 5 is a signal timing diagram of an exemplary embodiment of a gate signal, a pixel electrode voltage and a luminance of a liquid crystal display according to the present invention.

FIG. 5 is a signal timing diagram of an exemplary embodiment of gate signals VGn and Vg'n, a data voltage Vd applied to the pixel electrode 191, and a luminance Lu of a pixel PX of an LCD according to the present invention.

The data driver 500 generates a data voltage Vd1 based on an image signal supplied from an external source (not shown) and applies the data voltage Vd1 to the data lines D1-Dm.

The gate driver 400a applies the gate-on voltage Von to the first gate lines G1-Gn thereby turning on the first switching element Q of the corresponding pixels PX. Thus, the data voltage Vd1 is applied to the data lines D1-Dm and is thereby applied to the pixel electrode 191 of the corresponding pixel PX through the turned-on first switching elements Q.

As a result, terminals of the liquid crystal capacitor Clc are supplied with the data voltage Vd1 and the common voltage Vcom, thereby generating an electric field in the liquid crystal layer 3. Moreover, a difference between the data voltage Vd1 and the common voltage Vcom appears as a charged voltage, e.g., a pixel voltage, of the liquid crystal capacitor Clc. Thus, an arrangement, e.g., an alignment, of the liquid crystal molecules (not shown) in the liquid crystal layer 3 is controlled according to a magnitude and direction of the pixel voltage, and the polarization of light passing through the liquid crystal layer 3 is changed according to the same. Specifically, for example, when the liquid crystal layer 3 is a twisted nematic ("TN") mode liquid crystal layer 3, a long axis of the liquid crystal molecules is aligned substantially parallel to the direction of the electric field, and may be aligned substantially perpendicular to a plane defined by surfaces of the lower panel 100 and the upper panel 200. The change of the polarization is represented as a change in transmittance of the light through the polarizer, and the pixel PX thereby displays a luminance Lu related to the gray of the image signal to display a desired image on the LCD.

When the LCD according to one or more exemplary embodiments of the present invention is a normally-white mode LCD that displays a white image when the pixel voltage is zero (0) volts (V), the luminance Lu of the pixel PX decreases as the data voltage Vd1 is increased.

By repeating the abovementioned procedure for each unit of a horizontal period 1 H that is equal to one period of the horizontal synchronization signal and the data enable signal, the first gate lines G1-Gn are sequentially supplied with the gate-on voltage Von, thereby supplying the data voltage Vd1 to all pixels PX of the LCD to display an image for one frame.

Still referring to FIGS. 1-5, the gate driver 400b applies the gate-on voltage Von to the second gate lines g'i (where i=1, 2, . . . , n) connected to a corresponding same pixel row as the first gate lines Gi (n=1, 2, . . . , n), respectively, after a predetermined time difference Ta passes from a first time when the first gate line Gi is turned no, e.g., starts to be supplied with the gate-on voltage Von, to start to turn on the second switching element Qd of the corresponding pixel PX. Thus, the charges (positive charges or negative charges) in the pixel electrode 191 that forms one terminal of the liquid crystal capacitor Clc and the storage capacitor Cst and is in a floating state, flow into the transformation capacitor Cd. As a result, the data voltage Vd of the pixel electrode 191 is changed from the first data voltage Vd1 to be closer to the common voltage Vcom, thereby generating a data second voltage Vd2. Accordingly, the pixel voltage of the liquid crystal capacitor Clc is decreased, e.g., becomes closer to the common voltage Vcom. Thus, in the case of an inversion driving method in which the polarity of the data voltage Vd1 is reversed for each frame, the polarity of the voltage (e.g., the polarity of the charges) applied to the transformation capacitor Cd is opposite to the polarity of the data voltage Vd1 of the present frame, such that the pixel voltage of the liquid crystal capacitor Clc decreases, e.g., becomes closer to the common voltage Vcom, when the second switching element Qd is turned on.

In an exemplary embodiment, the time difference Ta between the first and second times when the first gate lines Gi (where i=1, 2, ..., n) and the second gate lines g'i (where i=1, 2, ..., n) connected to a same pixel row start to be applied with the gate-on voltage Von is greater than 1 horizontal period 1 h and is less than 1 frame period 1 frame (FIG. 5). In an exemplary embodiment, for example, the time difference Ta may be greater than or equal to about one-third (⅓) of a frame period and less than or equal to about two-thirds (⅔) of a frame period. More specifically, for example, the time difference Ta may be about one-half (½) of a frame period. However, the time difference Ta is not limited to the foregoing values in additional exemplary embodiments, but may instead be controlled to be suitable for the electro-optic characteristics of the particular LCD.

Thus, when the pixel voltage of the liquid crystal capacitor Clc is decreased after the predetermined time difference Ta, as shown in FIG. 5, the luminance Lu of the pixel PX is increased, and, accordingly, the pixel PX alternately efficiently represents low luminance and high luminance in one frame. Accordingly, images displayed during a portion of one frame and black is displayed during the rest of the frame such that a driving method similar to an impulse driving method is effectively utilized in the LCD, and motion picture display characteristics of the LCD are thereby substantially improved.

The luminance represented by one pixel PX during one frame is the average of the luminance of a first period Pa in which the data voltage Vd1 is applied, and the luminance of a second period Pb after the pixel voltage of the liquid crystal capacitor Clc is decreased. Accordingly, when the data voltages Vd applied to the pixel electrode 191 in the first period Pa and the second period Pb are appropriately controlled, images displayed at sides of the LCD accurately approximate the images shown at the front, e.g., the lateral gamma curve may be substantially the same as the front gamma curve, thereby significantly improving side visibility and viewing angle characteristics of the LCD according to the exemplary embodiments shown and described herein.

Additionally, in an exemplary embodiment of the present invention I which the LCD is a normally white mode LCD, to prevent a reduction of the contrast ratio when the pixel voltage is low, the pixel voltage for displaying black may be fully high, and, more particularly, the pixel voltage for displaying black may be higher than for a conventional LCD by about 1V to about 3V.

When the liquid crystal display according to another exemplary embodiment of the present invention is in a normally black mode, a luminance Lu, opposite to as shown in FIG. 5, when the difference between the data voltage Vd of the pixel electrode 191 and the common voltage Vcom is high, the luminance of the pixel PX is high, and if the difference between the data voltage Vd of the pixel electrode 191 and the common voltage Vcom is decreased, the luminance of the pixel PX is also decreased.

A capacitance value of the transformation capacitor Cd which substantially improves the side visibility and viewing angle characteristic in an exemplary embodiment of the present invention will now be described in further detail.

Referring to FIG. 4 and FIG. 5, the second data voltage Vd2 applied to the liquid crystal capacitor Clc in second period Pb may be represented as following Equation 1 (and Equation 2, derived from Equation 1), below.

$$Vd2=Vd1*(Clc+Cst)/(Clc+Cst+2Cd)=Vd1*Ra \quad \text{(Equation 1)}$$

$$Vd2/Vd1=Ra=(Clc+Cst)/(Clc+Cst+2Cd) \quad \text{(Equation 2)}$$

In Equations 1 and 2, the capacitors Clc, Cst, and Cd and the capacitances thereof are denoted by the same reference characters, and Vd1 indicates the data voltage Vd applied to the liquid crystal capacitor Clc in the first period Pa.

In Equation 1, a ratio Ra, e.g., a voltage ration that is equal to Vd2/Vd1, may be from about 0.5 to about 0.8 and, more particularly, may be about 0.7, to improve the viewing angle characteristics and to minimize a reduction of the contrast ratio. Thus, in an exemplary embodiment, the capacitance Cd of the transformation capacitor Cd may be greater than or equal to about 0.12 times a sum of the capacitances of the liquid crystal capacitor Clc and the storage capacitor Cst and less than or equal to about 0.5 times the sum of the capacitances of the liquid crystal capacitor Clc and the storage capacitor Cst. In an exemplary embodiment, for example, the capacitance Cd may be about 0.2 times the sum of the capacitances of the liquid crystal capacitor Clc and the storage capacitor Cst, although additional exemplary embodiments are not limited thereto.

Referring again to FIGS. 1, 2 and 5, the gate driver 400b sequentially applies the gate-on voltage Von to the second gate lines g'1-g'n for a unit of 1 horizontal period 1 H, thereby decreasing the luminance Lu of the pixels PX.

Hereinafter, an LCD according to another exemplary embodiment of the present invention will be described in further detail with reference to FIG. 6 and FIG. 7, as well as FIGS. 1-5.

Figure 6:
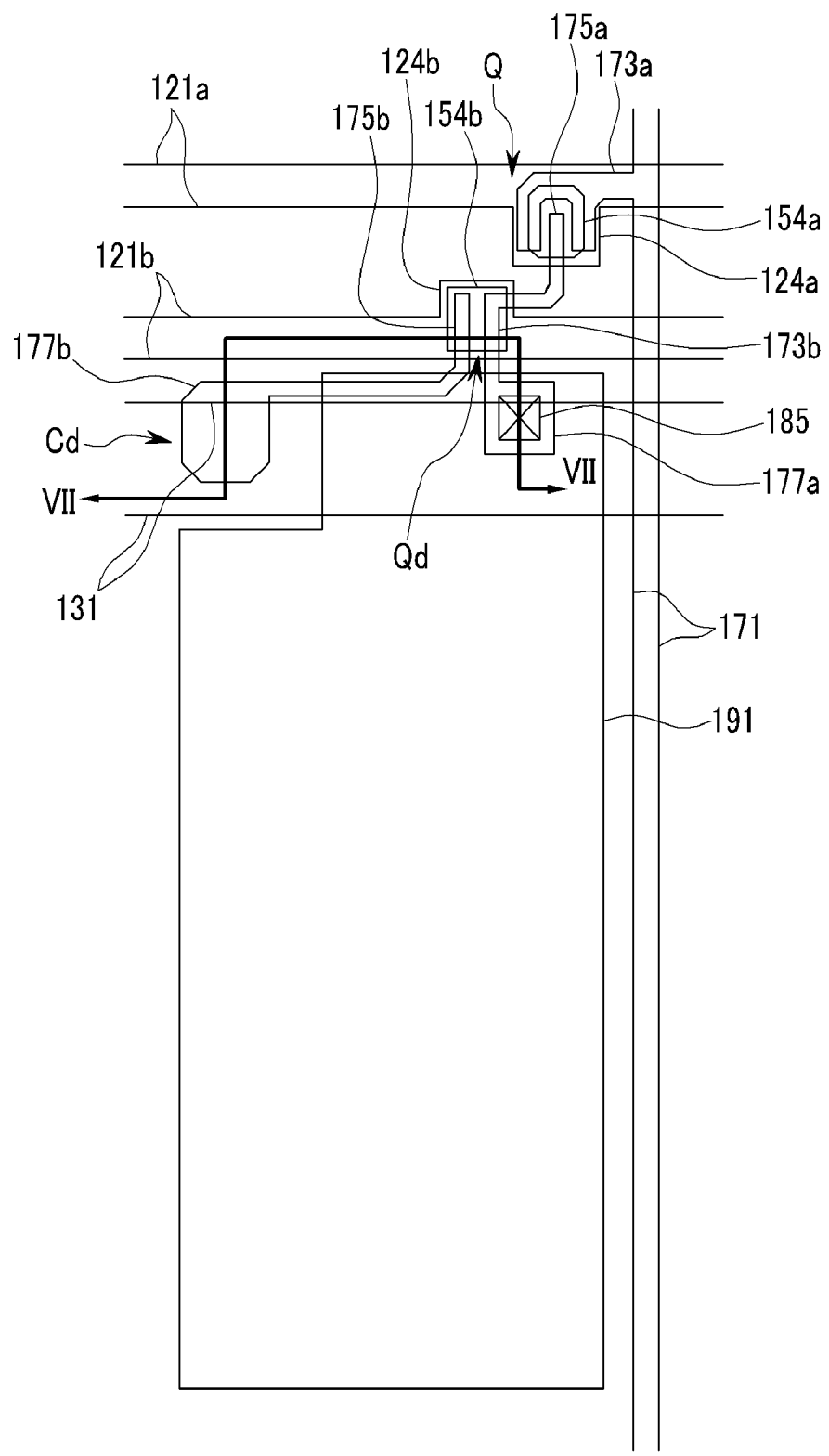
FIG. 6 is a plan view of an exemplary embodiment of a liquid crystal display according to the present invention.
Figure 7:
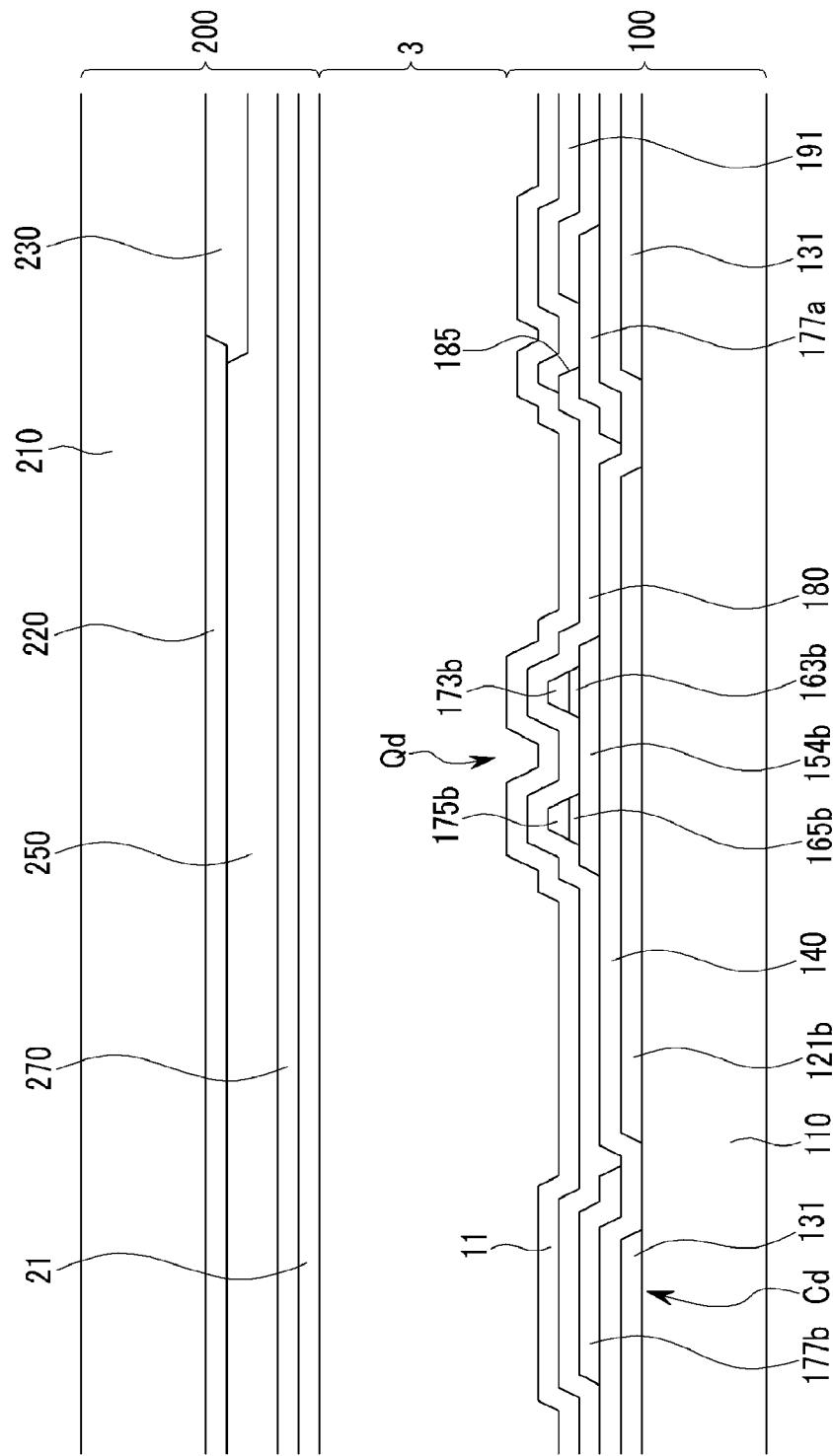
FIG. 7 is a partial cross-sectional view taken along line VII-VII of FIG. 6.

FIG. 6 is a plan view of an exemplary embodiment of a liquid crystal display according to the present invention, and FIG. 7 is a partial cross-sectional view taken along line VII-VII of FIG. 6.

A liquid crystal display according to an exemplary embodiment includes a lower panel 100 and an upper panel 200 facing each other, and a liquid crystal layer 3 between the lower panel 100 and the upper panel 200. Polarizers (not shown) may be provided on an outer surface of the lower panel 100 and/or the upper panel 200.

The upper panel 200 according to an exemplary embodiment includes a light blocking member 220 and a plurality of color filters 230 disposed on an insulation substrate 210. The color filters 230 are disposed in regions around the light blocking member 220, and each of the color filters 230 may display one of the primary colors, such as one of a red, green and blue color.

An overcoat 250 is disposed on the color filters 230 and the light blocking member 220. The overcoat 250 may be made of an insulator, such as an organic insulator, for example, and prevents the color filter 230 from being exposed, as well as providing a planarized, e.g., flat, surface. In one or more additional exemplary embodiments, the overcoat 250 may be omitted.

A common electrode 270 is disposed on the overcoat 250, and an alignment layer 21 is disposed on the common electrode 270.

The liquid crystal layer 3 is interposed between the lower panel 100 and the upper panel 200 and includes liquid crystal molecules (not shown) having dielectric anisotropy. The liquid crystal molecules may have long axes thereof aligned to be twisted between a surface of the lower panel 100 and a surface of the upper panel 200 when an electric field is not applied to the liquid crystal molecules, but additional exemplary embodiments are not limited thereto, and the liquid crystal molecules may be aligned in various other ways and/or according to various other modes.

The lower panel 100 according to an exemplary embodiment includes a plurality of gate conductors, such as first gate lines 121a, second gate lines 121b and storage electrode lines 131 disposed on an insulation substrate 110.

The first gate lines 121a and the second gate lines 121b extend along a first, substantially transverse, direction (as viewed in FIG. 6) and transmit gate signals. The first gate lines 121a include first gate electrodes 124a, and the second gate lines 121b include second gate electrodes 124b. As shown in FIG. 6, the first gate line 121a is disposed above the second gate line 121b, however additional exemplary embodiments are not limited thereto.

The storage electrode lines 131 substantially extend along the first direction and transmit a predetermined voltage, such as the common voltage Vcom. As shown in FIG. 6, the storage electrode line 131 is disposed under the second gate line 121b, but additional exemplary embodiments are not limited thereto.

A gate insulating layer 140 is disposed on the first gate line 121a, the second gate line 121b and the storage electrode line 131, as shown in FIG. 7.

First semiconductors 154a and second semiconductors 154b, which are both made of amorphous silicon ("a-Si") or crystalline silicon, for example, are disposed on the gate insulating layer 140. The first semiconductor 154a and the second semiconductor 154b are positioned on the first gate electrode 124a and the second gate electrode 124b, respectively.

A pair of ohmic contact islands (not shown) is disposed on the first semiconductors 154a, and a pair of ohmic contact islands 163b and 165b is disposed on the second semiconductors 154b. The ohmic contacts 163b and 165b may be formed with silicide, or with n+hydrogenated amorphous silicon in which n-type impurities, such as phosphors, are doped at a high concentration.

A data conductor, including data lines 171, first drain electrodes 175a and second drain electrodes 175b is disposed on the ohmic contacts 163b and 165b and the gate insulating layer 140.

The data lines 171 transmit the data signal and extend substantially along a second, substantially longitudinal direction, e.g., substantially perpendicular to the first direction, thereby intersecting the first gate lines 121a, the second gate lines 121b and the storage electrode lines 131. The data lines 171 include first source electrodes 173a extending from the data lines 171 toward the first gate electrodes 124a.

The first drain electrode 175a includes a bar-shaped end portion at one end opposite the first source electrode 173a and partially enclosed by the first source electrode 173a, a wide portion 177a at another end, and a second source electrode 173b disposed therebetween. The second source electrode 173b is disposed opposite the second drain electrode 175b. The second drain electrode 175b also includes a bar-shaped end portion at one end thereof facing the second source electrode 173b and a wide portion 177b at another end of the same. In an exemplary embodiment, the wide portion 177b overlaps a portion of the storage electrode line 131, thereby forming a transformation capacitor Cd.

The first gate electrode 124a, the first source electrode 173a and the first drain electrode 175a, along with the first semiconductor 154a, form a first thin film transistor ("TFT"), e.g., the first switching element Q, and the second gate electrode 124b, the second source electrode 173b, and the second drain electrode 175b, along with the second semiconductor 154b, form a second TFT, e.g., the second switching element Qd. Channels of the first and second TFTs are formed in the first semiconductor 154a between the first source electrode 173a and the first drain electrode 175a, and in the second semiconductor 154b between the second source electrode 173b and the second drain electrode 175b, respectively.

A passivation layer 180 is disposed on the data line 171, the first drain electrode 175a and the second drain electrode 175b, as well as on exposed portions of the first semiconductor 154a and the second semiconductor 154b. In an exemplary embodiment, the passivation layer 180 includes, e.g., is made of, an inorganic insulator and/or an organic insulator, and may have a flat, e.g., planarized, surface.

The passivation layer 180 includes contact holes 185 that expose the wide portions 177a of the first drain electrodes 175a.

Pixel electrodes 191 are disposed on the passivation layer 180.

The pixel electrodes 191 are physically and electrically connected to the first drain electrode 175a through the contact holes 185, to thereby receive the data voltage from the first drain electrodes 175a. The pixel electrode 191 forms the liquid crystal capacitor Clc along the common electrode 270 of the upper panel 200 and the portion of the liquid crystal layer 3 therebetween such that the applied voltage is maintained after the first and the second thin film transistors Q and Qd, respectively, are turned off.

The pixel electrode 191 overlaps the storage electrode line 131 with the gate insulating layer 140 and the passivation layer 180 interposed therebetween, thereby forming the storage capacitor Cst.

An alignment layer 11 is disposed on the pixel electrode 191 and the passivation layer 180.

In an exemplary embodiment, the alignment layers 11 and 21 may be alignment layer for a twisted nematic mode LCD or, alternatively, for a vertical alignment mode LCD.

The description above, made with reference to FIGS. 1-5, applies to the exemplary embodiment of the LCD shown in FIGS. 6 and 7, and any repetitive detailed description thereof has been omitted.

An LCD according to yet another exemplary embodiment of the present invention will now be described in further detail with reference to FIGS. 8-11. The same reference characters denote the same or like elements shown and described above, and any repetitive detailed description thereof will hereinafter be omitted or simplified.

Figure 8:
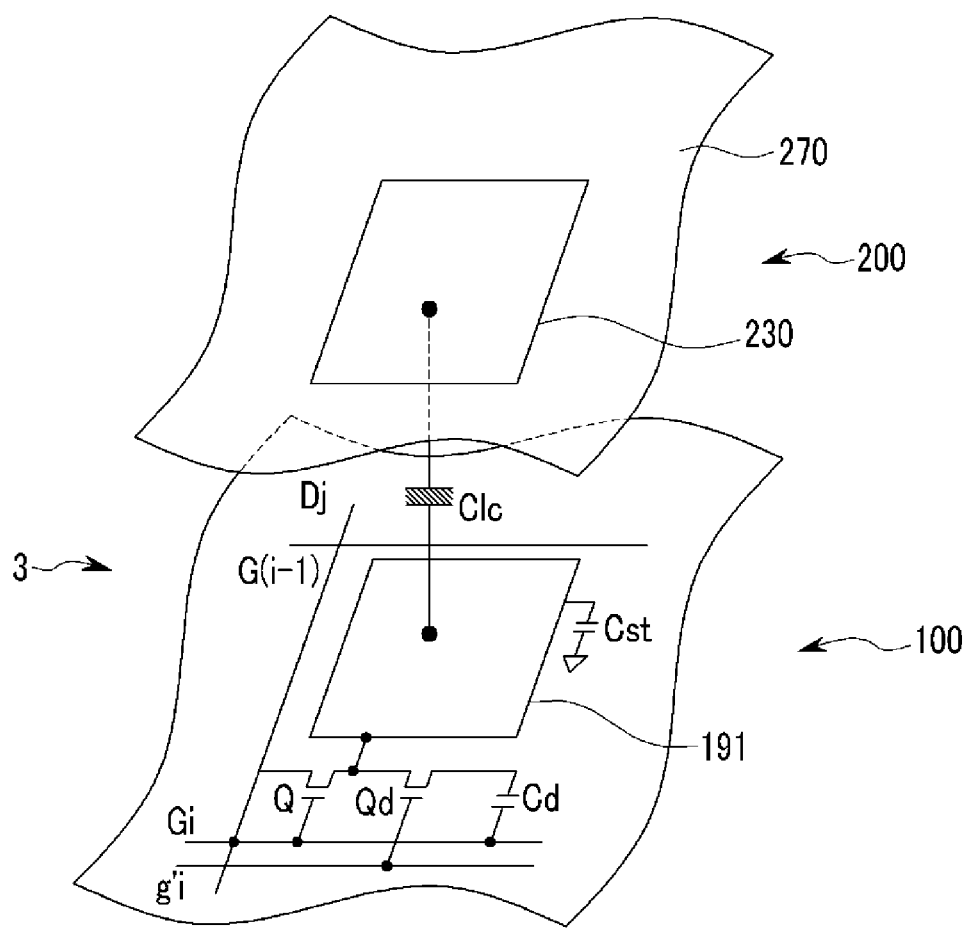
FIG. 8 is an equivalent circuit view of another exemplary embodiment of a pixel of a liquid crystal display according to the present invention.
Figure 9:
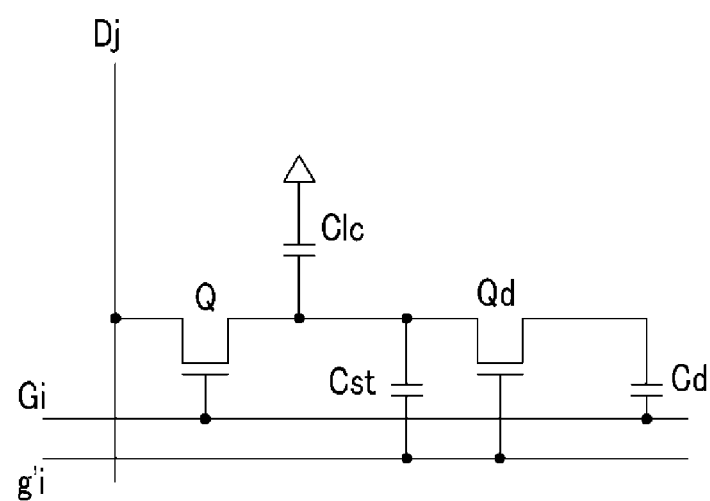
FIG. 9 is a schematic circuit diagram of an exemplary embodiment of one pixel of a liquid crystal display according to the present invention.
Figure 10:
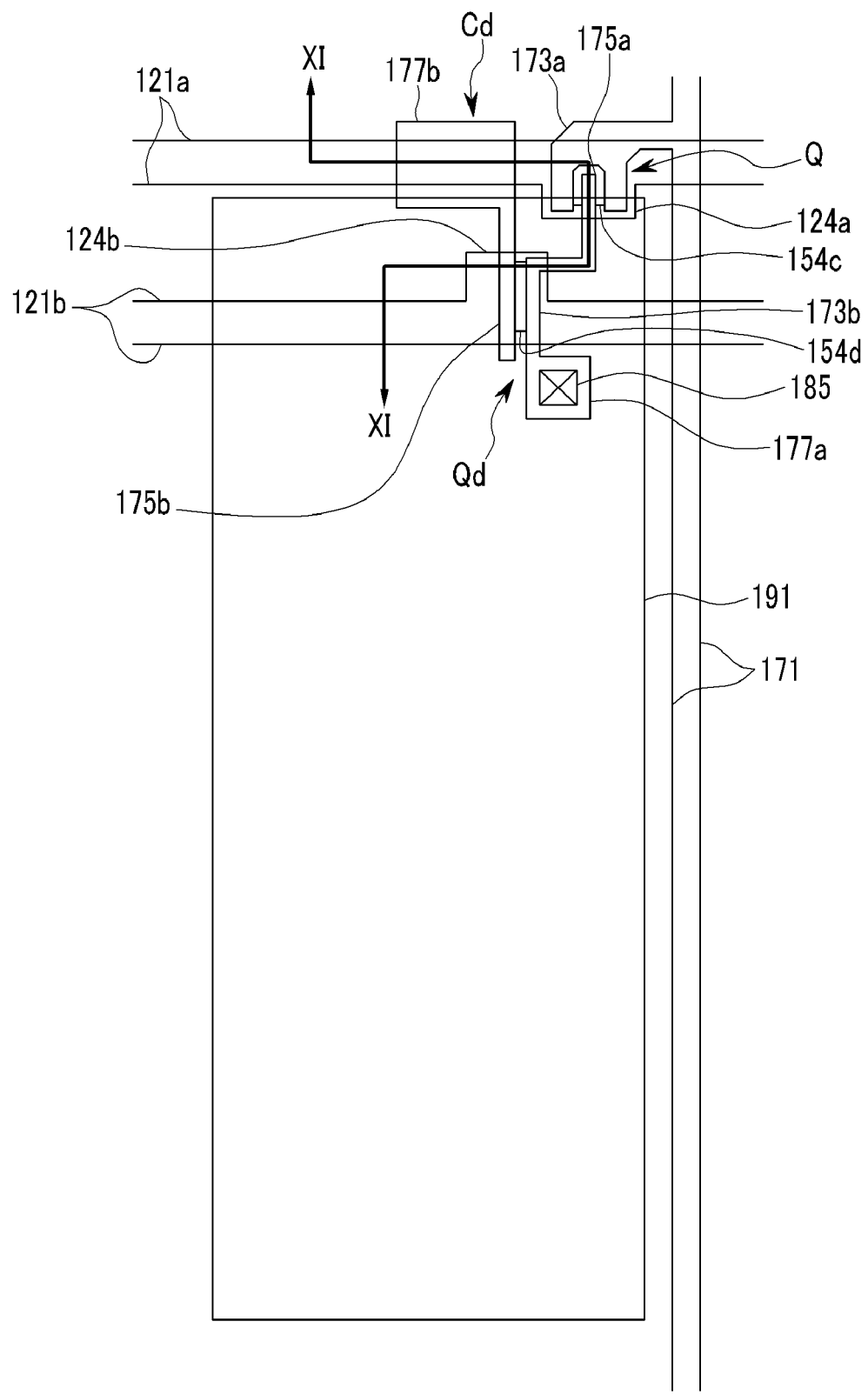
FIG. 10 is a plan view of another exemplary embodiment of a liquid crystal display according to the present invention.
Figure 11:
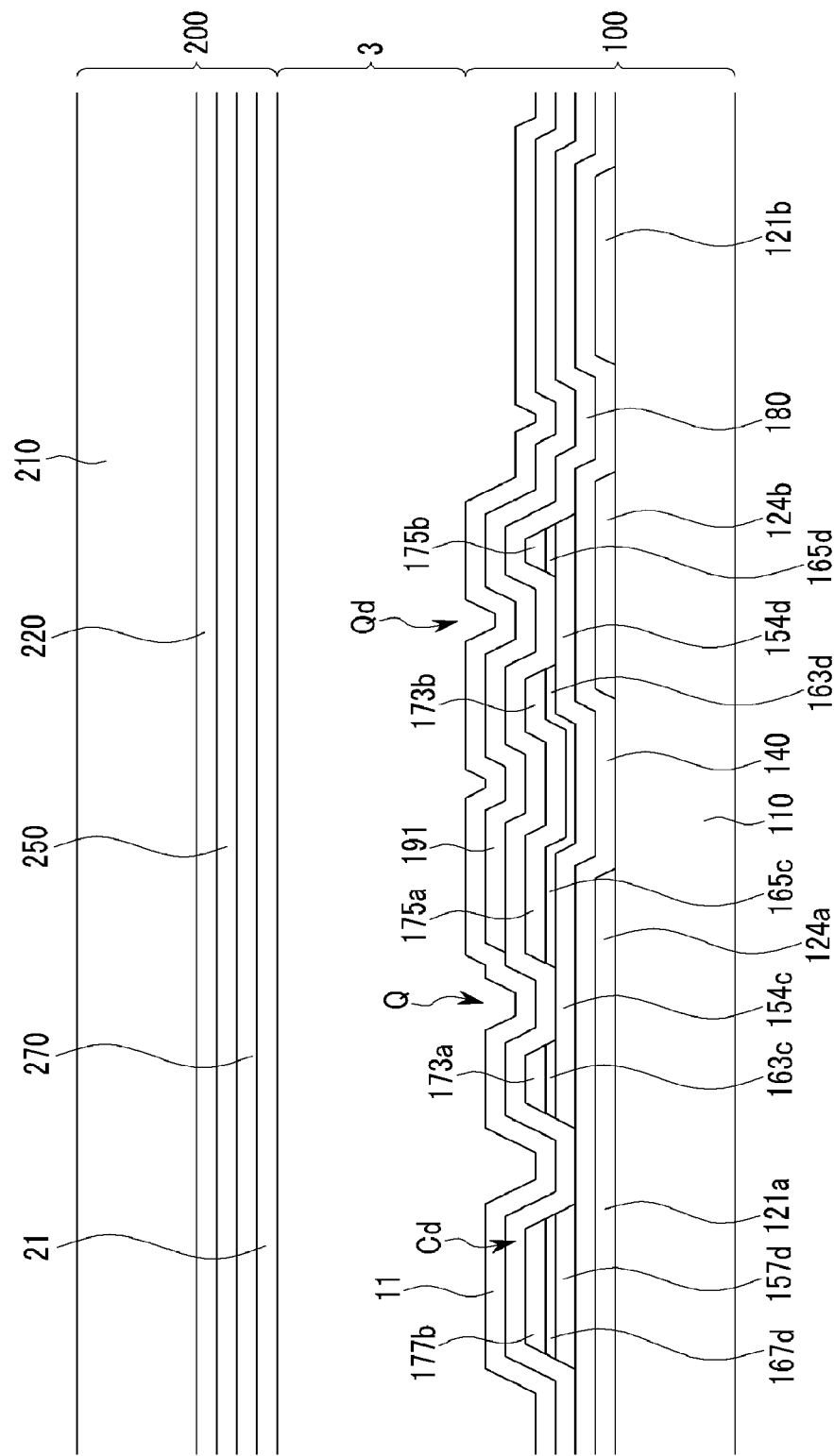
FIG. 11 is a partial cross-sectional view taken along line XI-XI of FIG. 10.

FIG. 8 is an equivalent circuit view of another exemplary embodiment of a pixel of an LCD according to the present invention, FIG. 9 is a schematic circuit diagram of an exemplary embodiment of one pixel of a liquid crystal display according to the present invention, FIG. 10 is a plan view of an exemplary embodiment of a liquid crystal display according to the present invention, and FIG. 11 is a partial cross-sectional view taken along line XI-XI of FIG. 10.

Referring to FIGS. 8-11, the liquid crystal display according to one or more exemplary embodiments is substantially the same as the exemplary embodiments described in greater detail above and shown in FIG. 3, FIG. 4, FIG. 6 and FIG. 7. However, in an exemplary embodiment, the storage electrode line 131 is different, in that the structure of the storage capacitor Cst and the transformation capacitor Cd and the structure of the semiconductor layer are different than as shown in FIG. 3, FIG. 4, FIG. 6 and FIG. 7, as will now be described in further detail.

Referring now to FIGS. 8-11, semiconductor stripes (not shown) are disposed on the gate insulating layer 140. The semiconductor stripes extend substantially along the second direction and include a first semiconductor 154c and a second semiconductor 154d extending toward the first gate electrode 124a and the second gate electrode 124b, respectively, and being connected to each other. The second semiconductor 154d includes an expansion 157d disposed under the wide portion 177b of the second drain electrode 175b.

Ohmic contact stripes (not shown) are disposed on the semiconductor stripes, a pair of ohmic contacts 163c and 165c are disposed on the first semiconductors 154c, and a pair of ohmic contacts 163d and 165d are disposed on the second semiconductors 154d. The ohmic contact 163c protrudes from the ohmic contact stripe, and the two ohmic contacts 163c and 165c are connected to each other. In an exemplary embodiment, the ohmic contact 165d includes an expansion 167d overlapping the expansion 157d of the second semiconductor 154d.

The semiconductor stripes, including the first semiconductor 154c and the second semiconductor 154d, have substantially the same planar shape as the data line 171, e.g., as the first drain electrode 175a, the second source electrode 173b and the second drain electrode 175b and the underlying ohmic contacts 165c, 163d and 165d, respectively, except for channel regions of the first thin film transistor Q and the second thin film transistor Qd.

In an exemplary embodiment, the storage capacitor Cst is formed by overlapping a portion of the pixel electrode 191 with the second gate line 121b and the gate insulating layer 140 and the passivation layer 180 interposed therebetween. The second gate line 121b is supplied with the gate-off voltage Voff such that it enhances the storage capacity of the voltage of the pixel electrode 191 by overlapping the pixel electrode 191 to form the storage capacitor Cst. However, when an area of the second gate line 121b overlapping the pixel electrode 191 is increased, the gate signal may be delayed However, the pulse width of the gate-on voltage Von of the gate signal of the second gate line 121b is not limited to the 1 horizontal period 1 H, but may be increased, thereby obviating or overcoming any problems due to signal delay.

In an exemplary embodiment, the transformation capacitor Cd is formed by overlapping the wide portion 177b of the second drain electrode 175b and a portion of the first gate line 121a.

Thus, in an exemplary embodiment, a storage electrode line is not required to be separately formed, and the first gate line 121a and the second gate line 121b may be used to form the storage capacitor Cst and the transformation capacitor Cd, thereby substantially increasing an aperture ratio of the pixel PX.

Figure 12:
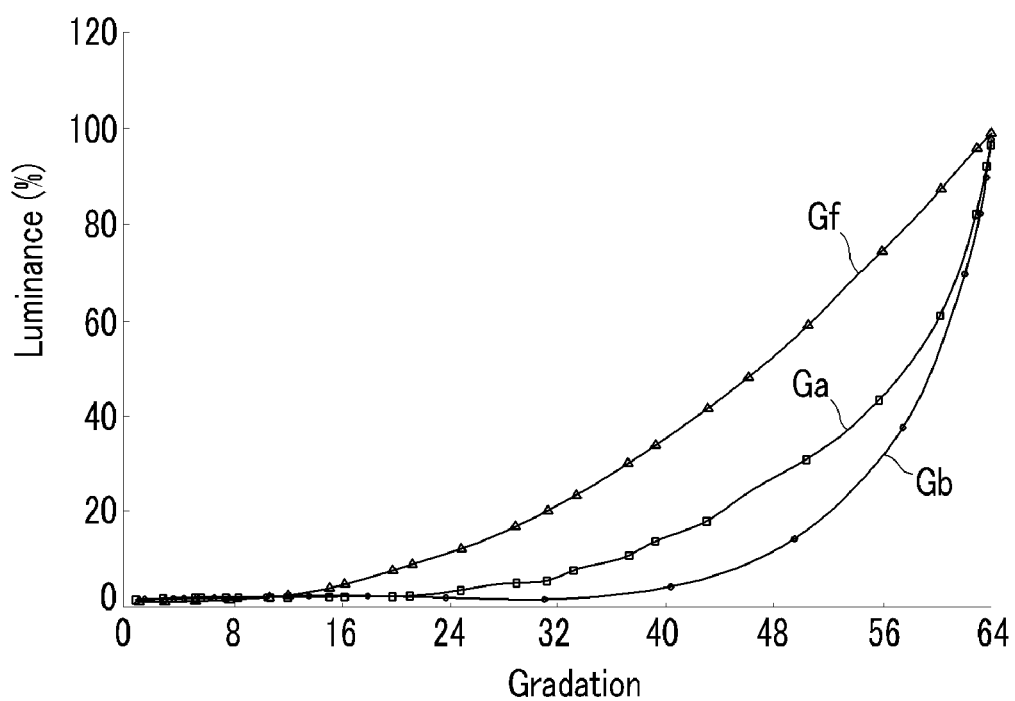
FIG. 12 is a graph of luminance versus gradation comparing gray levels of an exemplary embodiment of a liquid crystal display according to the present invention with a conventional liquid crystal display.
Figure 13:
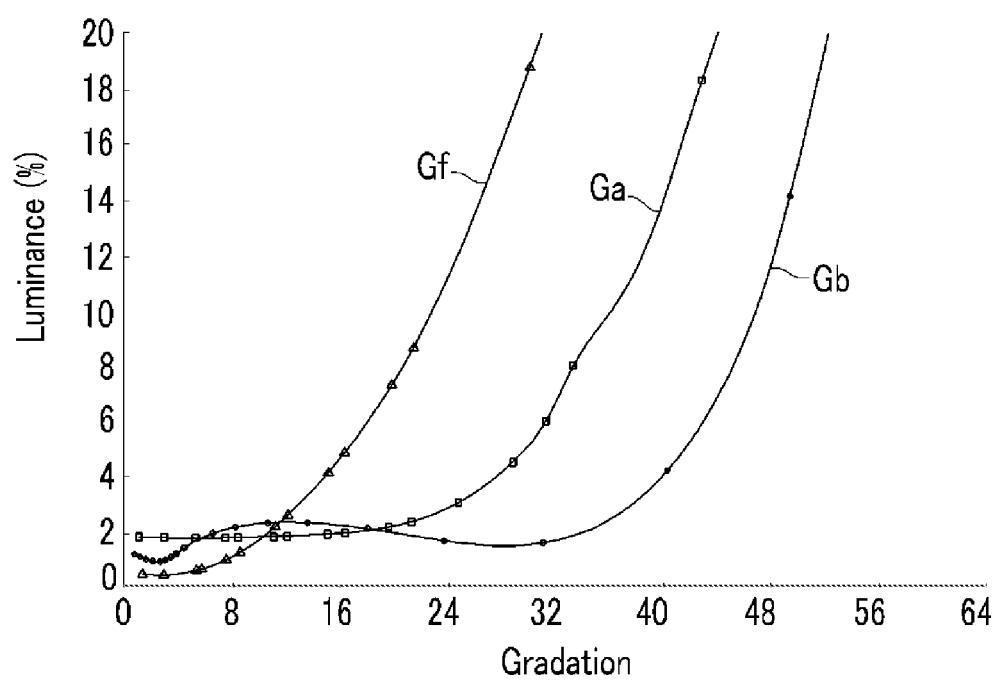
FIG. 13 is an enlarged portion of the graph shown in FIG. 12.

FIG. 12 is a graph of luminance versus gradation comparing gray levels of an exemplary embodiment of a liquid crystal display according to the present invention with a conventional liquid crystal display, and FIG. 13 is an enlarged portion of the graph shown in FIG. 12. More particularly, FIG. 12 illustrates an example of a front gamma curve Gf measured at a front side of an exemplary embodiment of a liquid crystal display according to the present invention and a lateral gamma curve Ga measured in the direction of a lower side of 45 degrees thereof, as well as a lateral gamma curve Gb measured in the direction of a lower side of 45 degrees of a conventional liquid crystal display when a ratio Ra of a data voltage Vd2 of the second period Pb to the data voltage Vd1 of the first period Pa in FIG. 5 and Equation 1 is about 0.7, and FIG. 13 is an enlarged portion of a low gray part of the graph in FIG. 12. In FIGS. 12 and 13, luminance is shown on the vertical axis, and has been converted into a percentage (%) value.

As shown in FIGS. 12 and 13, the lateral gamma curve Gb of the conventional liquid crystal display shows that gray inversion is generated at a gray below about 40, but gray inversion is not generated, even at the low gray portion, in the liquid crystal display according to one or more exemplary embodiments of the present invention as shown and described herein.

Additionally, as shown by the lateral gamma curve Ga of the exemplary embodiment of liquid crystal display according to the present invention whole grays are closer to the front gamma curve Gf and the luminance is also higher, as compared to the conventional LCD.

The present invention should not be construed as being limited to the exemplary embodiments set forth herein. Rather, these exemplary embodiments are provided so that this disclosure will be thorough and complete and will fully convey the concept of the present invention to those skilled in the art.

For example, in another additional exemplary embodiment, a method of driving an LCD, which includes a liquid crystal capacitor, a first switching element, a second switching element and a transformation capacitor, is provided, and the method includes transmitting a data voltage to the liquid crystal capacitor by turning on the first switching element, and turning on the second switching element after the first switching element is turned off. In an exemplary embodiment, a difference between a first time when the first switching element is turned on and a second time when the second switching element is turned on is greater than 1 horizontal period 1 H and less than 1 frame period.

Thus, while the present invention has been particularly shown and described with reference to exemplary embodiments thereof, it will be understood by those of ordinary skill in the art that various changes in form and details may be made therein without departing from the spirit or scope of the present invention as defined by the following claims.

What is claimed is:
1. A liquid crystal display comprising:
   a first gate line which extends along a first direction and transmits a first gate signal;
   a second gate line which extends along the first direction and transmits a second gate signal;
   a data line which extends along a second direction perpendicular to the first direction and transmits a data signal;
   a storage electrode line which includes a portion extending along the first direction and transmits a predetermined voltage;
   a first thin film transistor comprising:
     a first control electrode connected to the first gate line;
     a first source electrode connected to the data line; and
     a first drain electrode including an end portion at one end opposite the first source electrode and a first portion at another end;
   a second thin film transistor comprising:
     a second source electrode which is disposed between the end portion and the first portion of the first drain electrode and is included in the first drain electrode;

a second control electrode connected to the second gate line;

a second drain electrode including a second portion overlapping the storage electrode line in a plan view; and the second source electrode disposed opposite the second drain electrode; and a pixel electrode which is physically and electrically connected to the first drain electrode and receives the data signal from the first drain electrode, wherein the second gate line is disposed between the first gate line and the storage electrode line in the plan view.

2. The liquid crystal display of claim 1, wherein the second portion of the second drain electrode does not overlap the pixel electrode in the plan view.

3. The liquid crystal display of claim 2, wherein the first portion of the first drain electrode overlaps the storage electrode line in the plan view.

4. The liquid crystal display of claim 3, further comprising:
an insulating layer disposed on the first drain electrode, the insulating layer comprising a contact hole exposing a portion of the first drain electrode,
wherein the first drain electrode is connected to the pixel electrode through the contact hole, and
the contact hole overlaps the storage electrode line.

5. The liquid crystal display of claim 4, wherein a difference between a first temporal point when the first thin film transistor is turned on and a second temporal point when the second thin film transistor is turned on is greater than one horizontal period and less than one frame period.

6. The liquid crystal display of claim 3, wherein a difference between a first temporal point when the first thin film transistor is turned on and a second temporal point when the second thin film transistor is turned on is greater than one horizontal period and less than one frame period.

7. The liquid crystal display of claim 2, further comprising:
an insulating layer disposed on the first drain electrode, the insulating layer comprising a contact hole exposing a portion of the first drain electrode,
wherein the first drain electrode is connected to the pixel electrode through the contact hole, and
the contact hole overlaps the storage electrode line.

8. The liquid crystal display of claim 7, wherein a difference between a first temporal point when the first thin film transistor is turned on and a second temporal point when the second thin film transistor is turned on is greater than one horizontal period and less than one frame period.

9. The liquid crystal display of claim 2, wherein a difference between a first temporal point when the first thin film transistor is turned on and a second temporal point when the second thin film transistor is turned on is greater than one horizontal period and less than one frame period.

10. The liquid crystal display of claim 1, wherein the first portion of the first drain electrode overlaps the storage electrode line in the plan view.

11. The liquid crystal display of claim 10, further comprising
an insulating layer disposed on the first drain electrode, the insulating layer comprising a contact hole exposing a portion of the first drain electrode,
wherein the first drain electrode is connected to the pixel electrode through the contact hole, and
the contact hole overlaps the storage electrode line.

12. The liquid crystal display of claim 11, wherein a difference between a first temporal point when the first thin film transistor is turned on and a second temporal point when the second thin film transistor is turned on is greater than one horizontal period and less than one frame period.

13. The liquid crystal display of claim 10, wherein a difference between a first temporal point when the first thin film transistor is turned on and a second temporal point when the second thin film transistor is turned on is greater than one horizontal period and less than one frame period.

14. The liquid crystal display of claim 1, further comprising
an insulating layer disposed on the first drain electrode, the insulating layer comprising a contact hole exposing a portion of the first drain electrode,
wherein the first drain electrode is connected to the pixel electrode through the contact hole, and
the contact hole overlaps the storage electrode line.

15. The liquid crystal display of claim 14, wherein a difference between a first temporal point when the first thin film transistor is turned on and a second temporal point when the second thin film transistor is turned on is greater than one horizontal period and less than one frame period.

16. The liquid crystal display of claim 1, wherein a difference between a first temporal point when the first thin film transistor is turned on and a second temporal point when the second thin film transistor is turned on is greater than one horizontal period and less than one frame period.

* * * * *